Nov. 28, 1961   H. J. KOEBER, JR   3,010,359
NEEDLE ENTRAPMENT AUTOMATIC EXPOSURE CONTROL MECHANISM
Filed Nov. 3, 1958   6 Sheets-Sheet 1

Inventor:
Henry J. Koeber, Jr.
By Hill, Sherman, Meroni, Gross & Simpson Attys.

Nov. 28, 1961  H. J. KOEBER, JR  3,010,359
NEEDLE ENTRAPMENT AUTOMATIC EXPOSURE CONTROL MECHANISM
Filed Nov. 3, 1958  6 Sheets-Sheet 2
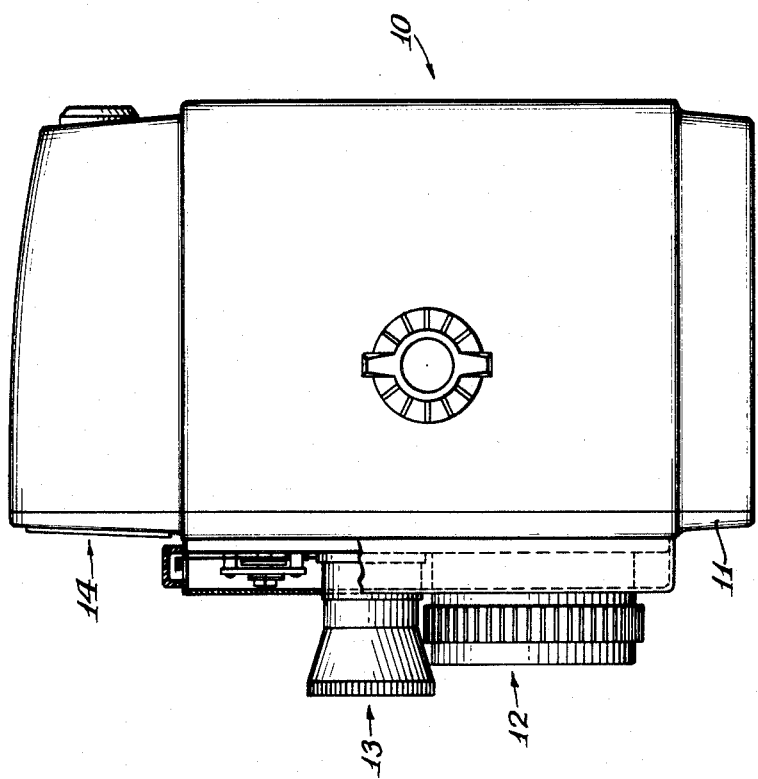
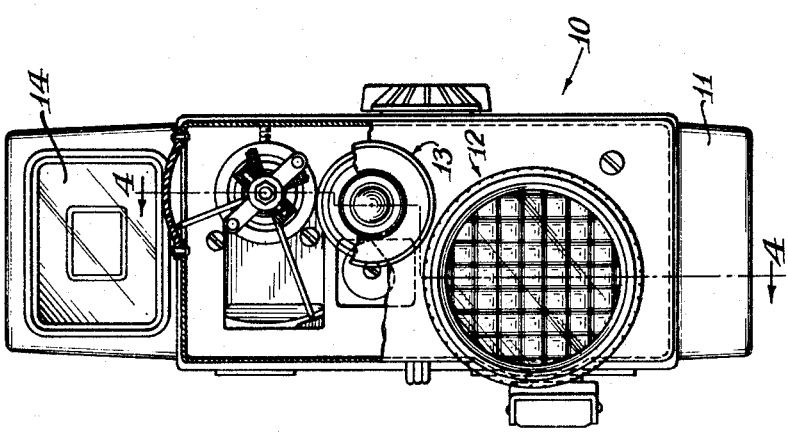
Inventor:
Henry J. Koeber, Jr.
By
Hill, Sherman, Meroni, Gross & Simpson Attys.

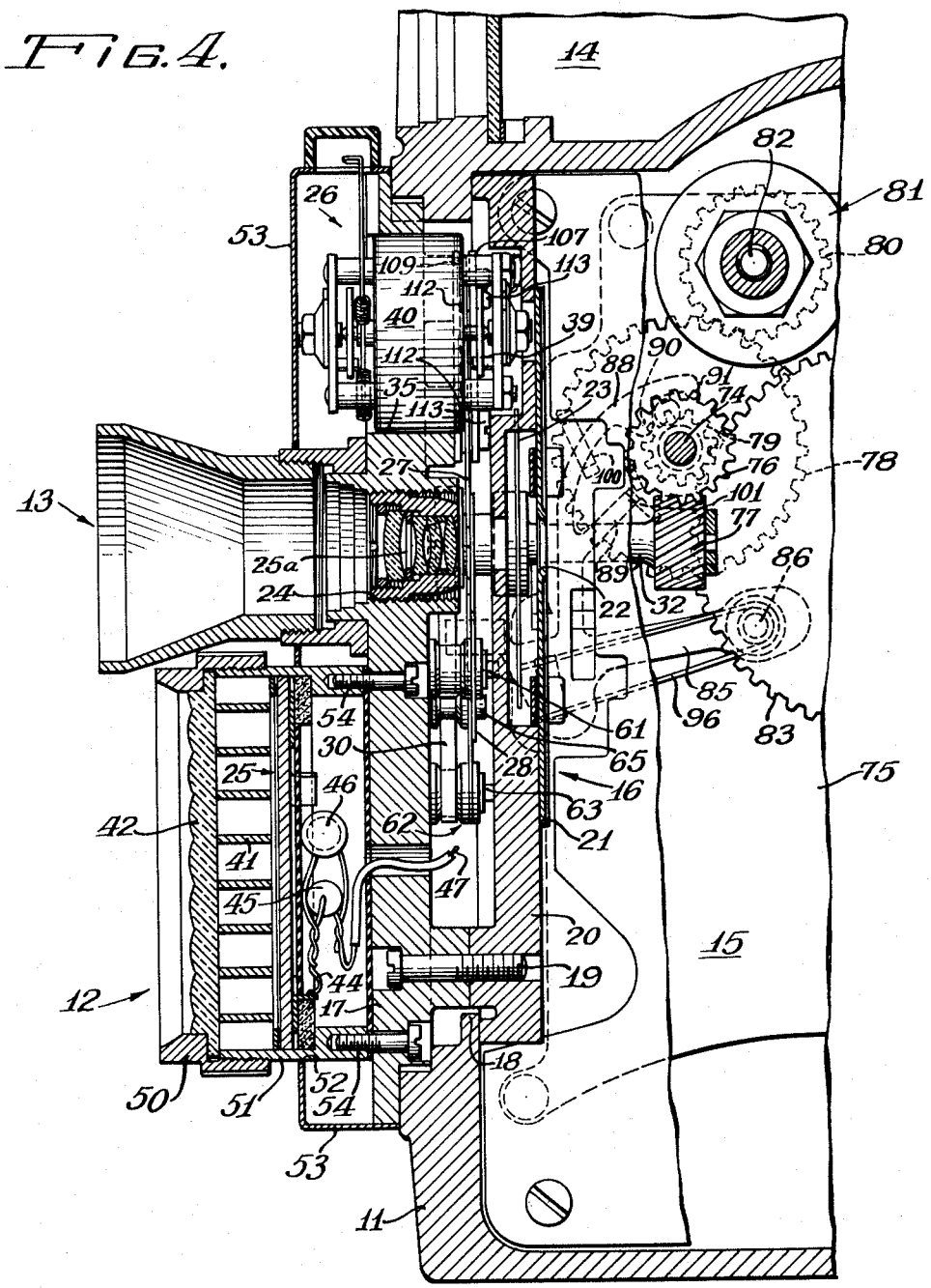

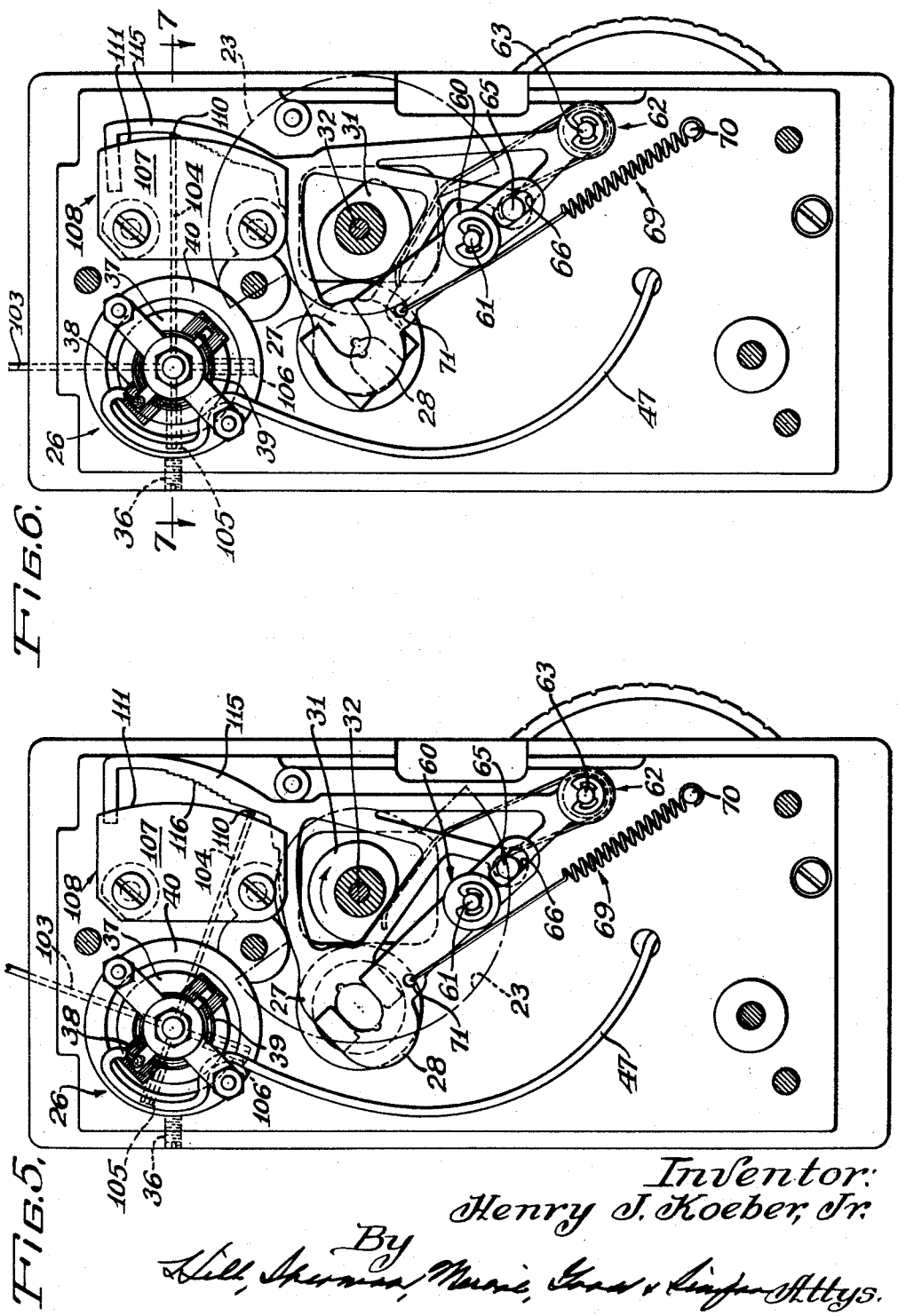

Nov. 28, 1961 H. J. KOEBER, JR 3,010,359
NEEDLE ENTRAPMENT AUTOMATIC EXPOSURE CONTROL MECHANISM
Filed Nov. 3, 1958 6 Sheets-Sheet 6

Inventor:
Henry J. Koeber, Jr.
By
Hill, Sherman, Meroni, Gross & Simpson Attys.

United States Patent Office 3,010,359
Patented Nov. 28, 1961

3,010,359
NEEDLE ENTRAPMENT AUTOMATIC EXPOSURE CONTROL MECHANISM
Henry J. Koeber, Jr., Deerfield, Ill., assignor to Bell & Howell Company, Chicago, Ill., a corporation of Illinois
Filed Nov. 3, 1958, Ser. No. 771,449
11 Claims. (Cl. 88—16)

This invention relates to apparatus for adjusting the exposure of a photographic camera to provide proper exposure of the film therein under different light conditions, and has for its general object the provision of a new and improved apparatus of this character.

More particularly this invention is directed to an improved apparatus for automatically varying the area of the diaphragm opening within a motion picture camera as a function of the available light about the camera.

Heretofore many and varied means have been devised for controlling the size of the diaphragm opening for selectively restricting and enlarging the cross-sectional area of the light passage intermediate the light receiving aperture in the camera and the film to be exposed. Such means generally comprise a plurality of iris members which are selectively movable to restrict or enlarge the diaphragm opening and which may be automatically or manually adjusted. Generally, such automatic control systems comprise a photoelectric eye, a galvanometer electrically connected to the photoelectric cell, a rotary meter coil associated with the galvanometer and rotatable as a function of the electrical energy derived from the photoelectric cell, and some form of gear means interconnecting the rotatable meter coil with the iris members to pivotally move the iris members to thereby vary the area of the diaphragm opening.

Since automatic exposure control mechanisms of the type described above generally comprise a plurality of interconnected rotary members, it has generally been found advantageous, if not necessary, to both statically and inertially balance the control system to render the system substantially insensitive to movements of the photographic camera itself. Obviously, however, inertially and statically balancing the rotative members in a diaphragm opening control mechanism is a relatively difficult task necessitating the formation of the various movable members therein within relatively close tolerance and the expenditure of considerable labor.

In view of the foregoing and in order to obviate the disadvantageous characteristics of such automatically operable diaphragm opening control mechanisms, applicant hereinafter sets forth with particularity an automatically operable diaphragm opening control mechanism which need not be either inertially or statically balanced and which may be relatively economically produced but which, nonetheless, is effective to render the cooperating iris members defining the diaphragm opening relatively insensitive to movements of the photographic camera itself.

Applicant's diaphragm opening control mechanism includes generally a photoelectric cell, a galvanometer having a pivoted meter coil associated therewith rotatable as a function of the electrical energy derived from said photoelectric cell, a pair of movable iris members cooperable to form a diaphragm opening, spring means biasing the iris members into a diaphragm open position, rotary cam means operable to move said iris members against the biasing force of the spring means in a diaphragm closing direction, and mechanical means connected to the meter coil for co-rotatable movement therewith cooperable with the iris members to limit pivotal movement of the iris members in a diaphragm closing direction as a function of the intensity of light impinging on the photoelectric cell.

An important feature of the present invention is that the rotary shutter which is disposed adjacent the film exposing aperture in the camera for opening and closing the aperture periodically during successive film feed intervals is so connected with the diaphragm opening control mechanism that the iris members are moved to a diaphragm open position each time the exposure aperture is closed by the rotary shutter and are each again moved in a diaphragm closing direction simultaneously with the opening of the rotary shutter with respect to the exposure aperture. The mechanical means for limiting diaphragm closing movement of the iris members may comprise a needle, as is shown on the appended drawings and is so arranged that the needle is free to move to a plurality of positions with respect to the iris members to thereby control the area of the diaphragm opening defined by the movable iris members. The mechanism is, however, so constructed that the needle is only free to move to these different positions during that time when the rotary shutter is in a closed position with respect to the exposure aperture so that when the film within the camera is exposed to the light, that is, when the rotary shutter is in an open position with respect to the exposure aperture, the movable components of the diaphragm opening control mechanism are maintained in a fixed position.

Since rotatable movement of the needle is stopped during each revolution of the rotary shutter the movable iris members are maintained relatively insensitive to movements of the photographic camera itself. It will thus become apparent that in an automatic diaphragm opening control mechanism including a needle entrapment means of the type above described, it is unnecessary to statically balance the movable components in the mechanism or to inertially balance the system to prevent movement of the iris members upon movement of the camera.

It will further hereafter become apparent that a means is provided for automatically stopping the camera drive in such a position that the rotary shutter is located in a closed position with respect to the exposure aperture so that the needle is free to move as a function of the intensity of light impinging on the photoelectric cell when the camera is not running.

Accordingly, it is a principal object of the present invention to provide an improved means for adjusting the diaphragm opening in a photographic camera.

Another object of the present invention is to provide an improved means for adjusting the diaphragm opening in a photographic camera which is substantially insensitive to movements of the camera itself but which need not be either inertially or statically balanced.

A further object of the invention resides in the provision of a pair of cooperating iris members which are spring biased in one direction and which are moved in an opposite direction by resilient means and, further, in which light sensitive means are associated with the iris members to limit the movement thereof in a diaphragm closing direction.

Yet another object of the invention is to provide a means for moving the iris members to a diaphragm open position during each revolution of the rotary shutter while simultaneously permitting free travel of the means limiting diaphragm closing movement of the iris members.

A still further object of the present invention is to provide a device of the type above described wherein the means functioning to limit diaphragm closing movement of the iris members comprises a needle connected to the meter coil of a galvanometer for co-rotational movement therewith, in which rotatable movement of the needle is stopped periodically by entrapment of the needle during each revolution of the rotary shutter.

A further and important object of the invention is the provision of a means effective to entrap the needle and prevent rotation thereof simultaneously with rotation of the rotary shutter to an aperture closed position with respect to the exposure aperture and with the movement of the iris members to a diaphragm open position.

These and other objects of the invention will become apparent from time to time as the following specification proceeds and with reference to the accompanying drawings, wherein:

FIGURE 2 is a front elevational view of a motion picture camera constructed in accordance with the principles of the present invention and showing a portion of the front wall thereof broken away to expose the diaphragm opening control mechanism which forms the subject of this invention;

FIGURE 3 is a side elevational view of a motion picture camera constructed in accordance with the principles of the present invention and showing a portion of the front wall of the camera broken away to expose a portion of the diaphragm opening control mechanism;

FIGURE 4 is a vertical sectional view of the camera illustrated in FIGURES 1–3 and showing some of the parts thereof in side elevation;

FIGURE 5 is a rear elevational view of the diaphragm opening control mechanism of the present invention and showing the controlling iris blades in a diaphragm open position;

FIGURE 6 is a rear elevational view of the diaphragm opening control mechanism of the present invention which is similar in nature to FIGURE 5 but which shows the controlling iris blades in a diaphragm closed position;

Figure 1:
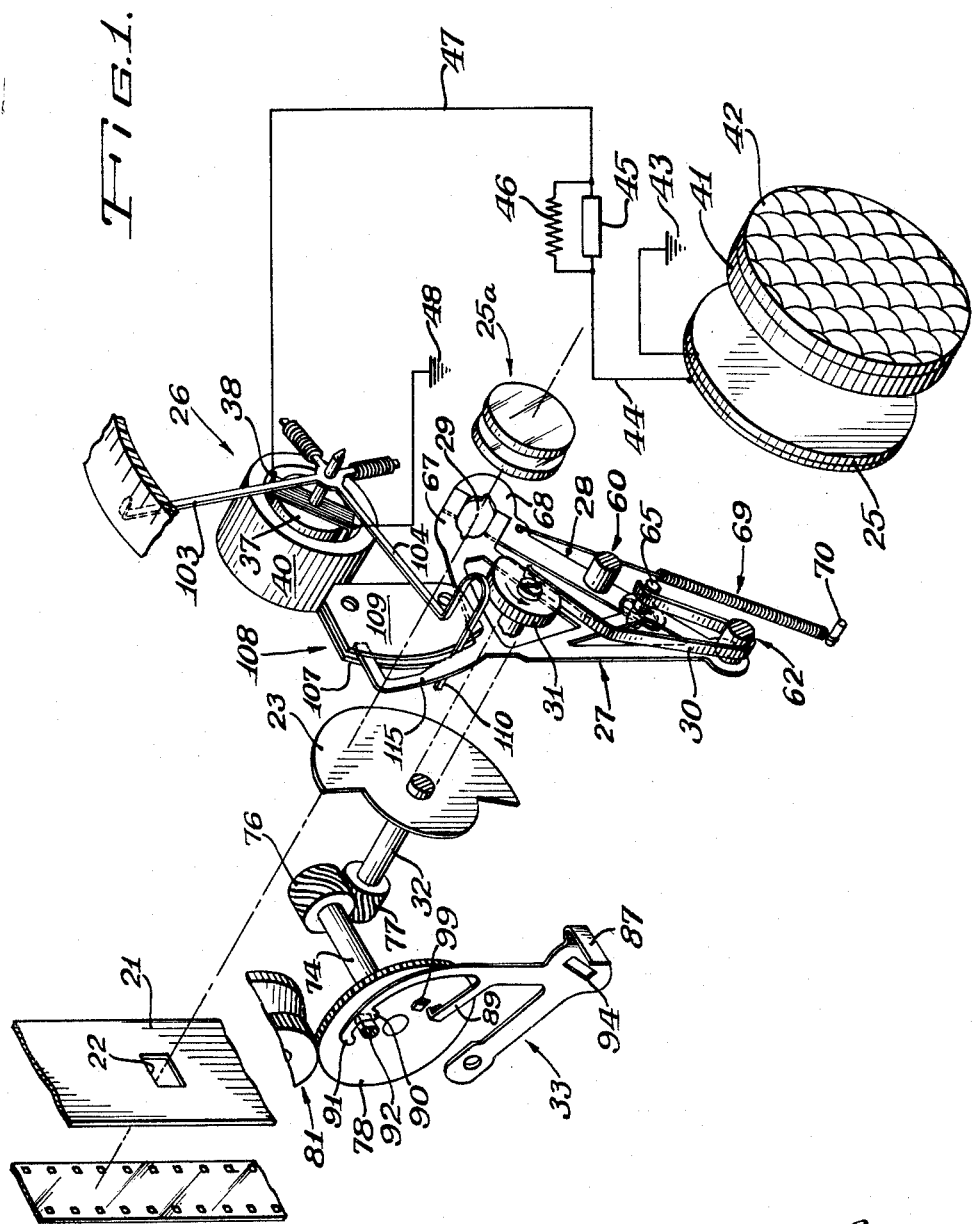
FIGURE 1 is an exploded pictorial view of the exposure control mechanism of the present invention together with parts of the camera related thereto and including the circuit diagram of the control.

In the embodiment of the invention illustrated particularly in FIGURES 2–4, there is shown a motion picture camera 10, which per se is of standard design, and which includes generally a casing 11 having a photoelectric eye 12, a lens 13, and a view finder 14 associated therewith. The casing 11 served to enclose the mechanism of the camera and provides a film chamber 15 within which are arranged two spaced rotatable film spools (not shown) and a vertical exposure guide 16 arranged at the front portion of the film chamber 15.

The front wall 17 of the camera casing 11 comprises a separate part detachably secured in a shouldered opening 18 in the front of the main casing 11 by headed screws 19 screw-threaded rearwardly into a frame part 20 fixed within the main casing portion 11.

The exposure guide 16 comprises a front guide plate 21 which is secured within the casing on the frame part 20 in rearwardly spaced relation with the front wall 17. Film is guided against the rear face of the guide plate 21, and the guide plate is provided with a forwardly facing horizontally elongated rectangular exposure aperture 22, conforming with a standard motion picture frame, through which successive frames of the film are exposed as the film is intermittently fed through the exposure guide. It will further be noted that a rotary shutter 23 is positioned immediately in front of the guide plate which is rotated in timed relation with the intermittent feed of the film to cover the exposure aperture 22 during the film feed intervals as is usual.

The front wall 17 is provided with a lens opening 24 with which the exposure aperture 22 is aligned and a suitable photographic lens 25a is mounted on the front wall within the lens opening and in alignment with the lens opening and exposure aperture for forming images on the film at the exposure aperture.

As shown in the diagrammatic representation of the diaphragm opening control mechanism of the present invention illustrated in FIGURE 1, a photoelectric cell 25 is electrically connected with a galvanometer 26 which is, in turn, associated with a pair of cooperating iris blades 27 and 28 which are cooperable to form a diaphragm opening 29. A flat spring 30 is provided to bias the iris members 27, 28 to a diaphragm open position while a cam 31 is operable to move the iris members 27, 28 into a closed diaphragm position. The cam 31 is affixed to the outer end portion of a power shaft 32 which also co-rotatably supports the rotary shutter 23. It will further be understood that a mechanism for controlling the operation of the camera is operatively connected to the power shaft 32 through suitable gearing so that rotary motion may be imparted to the power shaft 32 through the mechanism 33 to effect rotatable movement of the cam 31 whereby controllably moving the iris blades 27, 28. An entrapment needle 104 is associated with the galvanometer 26 and is cooperable with a portion of iris member 27 to limit diaphragm closing movement in a manner which will hereinafter be described more fully in detail.

Figure 8:
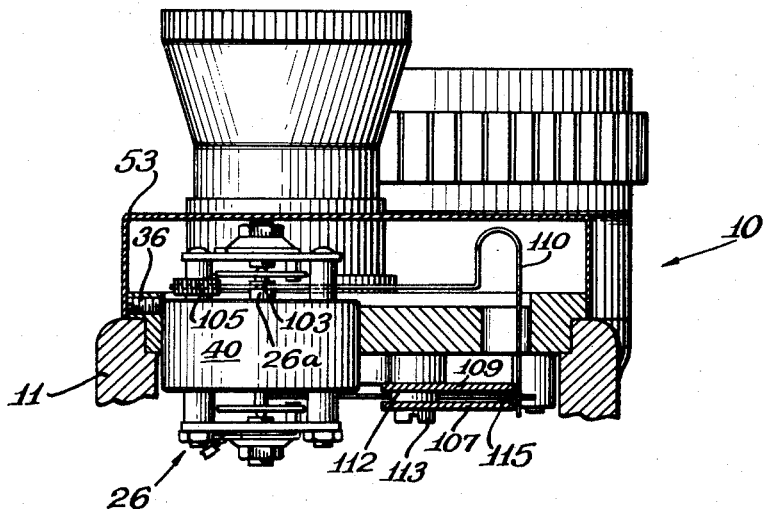
FIGURE 8 is a partially elevational partially sectioned view of the forward end of the camera of the present invention which is similar in nature to FIGURE 7 but which shows the upper end of the camera broken away to expose a portion of the diaphragm opening control mechanism.

As shown most clearly in FIGURE 4, the front wall 17 is provided with a bore 35 therethrough parallel to the lens opening 24 and disposed upwardly and to one side thereof which is arranged to receive the galvanometer 26. The galvanometer 26 is, as will be observed in FIGURE 5 or 8 secured within the bore 35 by means of a set screw 36. The galvanometer 26 is of usual construction and comprises a central cylindrical permanent magnet 37 (see particularly FIGURE 1), a pivoted rectangular circuit coil 38 surrounding the magnet 37 and spring biased to a zero position by spiral springs 39, and a ring 40 of magnetic material surrounding the coil and serving to concentrate the magnetic field of the magnet. The galvanometer is so positioned that the pivotal axis of the coil is normal to the plane of the exposure aperture 22.

The forwardly facing photoelectric cell 25 is mounted on the front face of the front wall 17 below the lens 25a and has the usual light controlling baffle 41 disposed in front of the cell and the usual recticular lens 42 secured in front of the baffle by suitable securing means.

The photoelectric eye 12 comprises in addition to the photoelectric cell 25, recticular lens 42, and baffle 41 a securing ring 50 which is threadedly mounted on a cylindrical boss 51 extending through the aperture 52 in front cover plate 53. Forwardly projecting studs 54 extend through the forward wall 17 and are screw-threaded into the cylindrical boss 51 to maintain the boss in engagement with the forward wall 17 thus rigidly positioning the photoelectric eye assembly 12 within the aperture 52.

The circuit coil of the galvanometer is connected in circuit with the photoelectric cell 25 so that the coil is deflected from its spring biased zero position by current derived from the photoelectric cell in proportion to the intensity of light impinging on the photoelectric cell, the photoelectric cell and galvanometer circuit comprising one terminal of the photoelectric cell connected, as designated at 43, to the metal framework of the mechanism which framework is for convenience referred to as "ground," the other terminal of the cell connected by a conductor 44 to one terminal of a resistor 45 and of a resistor 46, which is connected in shunt with the resistor 45, the other terminals of these resistors are connected by a conductor 47 to one terminal of the circuit coil 38 of the galvanometer 26, and the terminal of this coil is connected to ground as designated at 48.

The purpose of the resistors 45 and 46 is to compensate for the positive temperature coefficient of resistance of the photoelectric cell and the galvanometer circuit per se, so that the deflection of the circuit coil 38 is approximately uniform throughout the range of temperature normally encountered in use, as from zero to 100° F., and for this purpose the resistor 45, commercially known as a thermistor, has a negative temperature coefficient of resistance greater than the positive temperature coefficient of resistance of the photoelectric cell and galvanometer circuit per se, and the resistor 46, serving as a modifying resistor, has a temperature coefficient of resistance lying between the positive temperature coefficient of resistance of the photoelectric cell and galvanometer circuit per se and the negative temperature coefficient of resistance of the thermistor 45, the characteristics of these resistances being selected to obtain the aforesaid compensation, as fully described and claimed in copending application for United States patent of Mervin W. LaRue, Jr., and William W. Wightman, Serial No. 628,753 filed December 17, 1956 for "Exposure Control for Photographic Cameras" and assigned to the assignee hereof.

Referring now most particularly to FIGURES 1, and 4-6, it will be noted that iris member 28 is pivotally mounted with respect to wall 17 and frame part 20 by means of a pivot pin 60 extending through the iris member 28 intermediate the ends thereof. A radially reduced end portion 61 of the pivot member 60 is journaled in a suitable receiving aperture in the frame part 20. Similarly, iris member 27 is pivotally mounted with respect to the wall 17 and frame part 20 by means of a pivot pin 62 which is connected to the member 27 at the lower end thereof and which has a radially reduced outwardly projecting end portion 63 which is arranged to be received within a suitable receiving aperture in the frame part 20. For reasons which will hereinafter become fully apparent the iris members 27 and 28 are also pivotally connected with one another by means of a pivot pin 65 which is affixed to iris member 27 and which extends outwardly therefrom on opposite sides thereof. The pin 65 is arranged to slidably move within an elongated slot 66 formed within the lower end portion of the iris member 28 to drivingly engage member 28 to pivotally move same and thereby vary the area of the diaphragm opening 29. It will thus be observed that the pivot pin 65 is spaced intermediate members 60 and 62 so that upon downward movement of the pin 65 (as shown in FIGURE 1) the iris blades 67 and 68 formed at the upper end portions of the iris members 27 and 28 will be moved toward one another to decrease the area of the diaphragm opening 29. Conversely, upward movement of the pin 65 will move the cooperating iris blades 67, 68 in opposite directions away from one another to thereby increase the area of the diaphragm opening 29.

An elongated resilient tension spring 69 is connected at the lower end thereof, to a stud 70 secured to front plate 17 and, at the upper end thereof, to the iris member 28 in a suitable aperture 71 formed therein adjacent the blade 68. In this manner the member 28 is biased to the counter-clockwise rotated position illustrated in FIGURE 5 and the member 27 is biased to its extreme clockwise rotated position through the driving connection with blade 28 by pivot pin 65.

As has hereinbefore been briefly described, a rotary cam 31 is provided to effect controllable movement of the iris member 27, 28 and is associated therewith in the following manner: A flat spring 30 is arranged with one end abutting and bent over the pivot pin 65 and extends about the pivot member 62 with its upper free end portion disposed adjacent the rotary cam 31. When the various parts of the diaphragm opening control mechanism are in the position illustrated in FIGURE 5 the biasing force of spring member 69 tending to maintain member 28 in its extreme counter-clockwise rotated position is greater than the opposing biasing force of spring member 30 so that a wide diaphragm opening is defined by the cooperating iris blades. Clockwise rotation of the cam 31 from the position illustrated in FIGURE 5 to the position illustrated in FIGURE 6 tends to move the free end of spring member 30 downwardly to thereby increase the biasing force of spring 30 urging the pivot pin 65 downwardly to effect clockwise rotatable movement of the iris member 28 against the biasing force of spring member 69 and counter-clockwise rotatable movement of the iris member 27 through pivot pin 61 to thereby decrease the area of the diaphragm opening 29.

The cam 31 is mounted on the outer free end portion of the power shaft 32 which, in turn, is journaled in the frame part 20 for rotatable movement with respect thereto. A second rotary power shaft 74 is disposed within the camera and has its ends journaled in a pair of spaced side plates 75 which are disposed within the camera on opposite sides of the film chamber 15 in parallel relation with one another. It will be noted that the shaft 74 has a helical gear 76 disposed on one end thereof which is positioned in driving engagement with a helical gear 77 affixed to the inner end portion of power shaft 32 to transmit rotary motion from the shaft 74 to the shaft 32. The opposite end of shaft 74 has large and small diameter spur gears 78 and 79, respectively, affixed thereto. The large diameter spur gear 78 is arranged to mesh with a gear 80 associated with a governor 81 which is positioned concentrically with a shaft 82 journaled in spaced supporting plates 75. An intermediate spur gear 83 drivingly engages the small diameter spur gear 79 mounted on power shaft 74 and serves to transmit rotary motion from a power source (not shown) to the spur gear 79.

The power source may comprise a simple spiral shaped manually wound spring operably connected to a large diameter spur gear. In this manner rotatable movement of the spur gear associated with the power source will effect rotatable movement of the intermediate spur gear 83 which, in turn, will rotatably move shaft 74 through gear 79 to thereby rotate the power shaft 32. The speed of rotation of shaft 74 will be tempered by cooperation of the spur gear 78 affixed thereto with spur gear 80 forming a part of the governor 81. Rotation of the power shaft 32 will, as has hereinbefore been noted, effect rotatable movement of the rotary shutter 23 and reciprocable movement of iris members 27, 28 with respect to one another.

Since the power source constantly urges rotation of the power transmission elements hereinbefore described, the mechanism 33 constitutes a simple stop associated with the large diameter spur gear 78.

Referring now more particularly to FIGURES 4 and 9-12 of the drawings, it will be noted that a lever 85 is pivotally mounted with respect to side plate 75 about a pin 86 secured to the plate 75. A control button 87 is formed integrally with the lever 85 and extends exteriorly of the edge of the plate 75 to provide a means for controlling the movement of the diaphragm opening control mechanism in the manner which will hereinafter be described.

Figure 10:
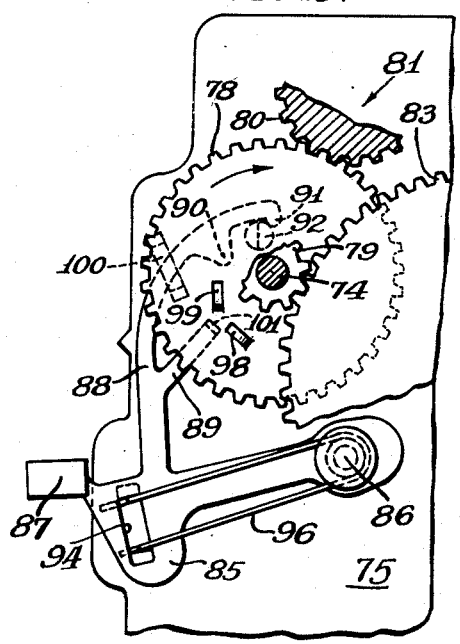
FIGURE 10 is a side elevational view of the mechanism illustrated in FIGURE 9 which is similar in nature to FIGURE 9 but which shows the mechanism in a "running" position.
Figure 11:
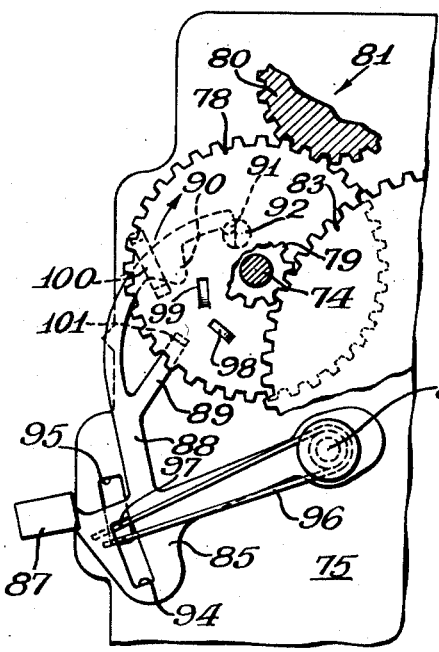
FIGURE 11 is another side elevational view of the mechanism illustrated in FIGURE 9 which shows the controlling mechanism in a "lock-run" position.
Figure 12:
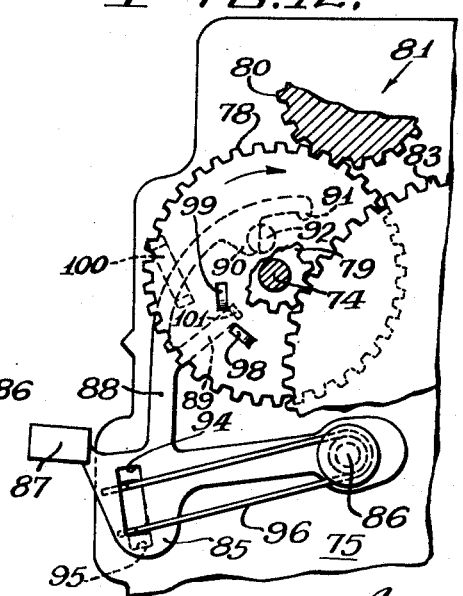
FIGURE 12 is yet another side elevational view of the mechanism illustrated in FIGURE 9 of the present invention but showing the mechanism in a "single frame" position.

A leg 88 having a somewhat arcuate configuration is formed integrally with the lever 85 also and has an arm 89 formed integrally therewith which extends toward the rotational axis of the gear 78. The outer free end of the leg 88 has a pair of spaced projections 90 and 91 formed integrally therewith and extending radially inwardly of the arcuate bow which are cooperable with a pin 92 secured to the plate 75 to locate the lever 85 in a desired rotated position. For reasons which will soon become obvious, the projection 90 merely serves as a stop to prevent clockwise rotatable movement of the lever 85 past the position illustrated in FIGURE 12. The projection 91, on the other hand, serves to provide a means for locating the lever 85 in a "running" position as is illustrated in FIGURE 10 or in a "lock running" position as is illustrated in FIGURE 11. Generally, depressional movement of the button 87 will effect counter-clockwise rotational movement of the lever 85 about its pivotal axis 86 to the position illustrated in FIGURE 10, wherein the nib 91 engages the pin 92. However, by exerting a greater downward pressure on the member 87 the leg 88 will flex slightly to permit the nib 91 to ride over the pin 92 and to thereby move the lever 85 to the rotated position illustrated in FIGURE 11.

Figure 9:
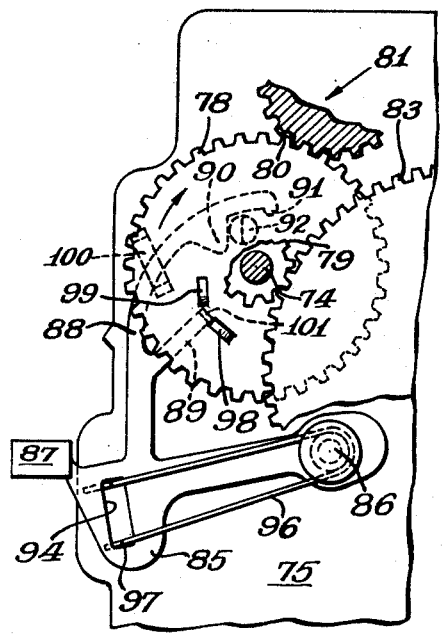
FIGURE 9 is a side elevational view of the mechanism for controlling the operation of the camera and showing the mechanism in a "stop" position.

An elongated aperture 94 is formed within the lever 85 adjacent the outer free end thereof which is normally congruent with an elongated aperture 95 formed in the plate 75 when the lever 85 is in an intermediate stop position as is illustrated in FIGURE 9. A U-shaped spring 96 encircles the pivot pin 86 and has its outer free ends stepped, as at 97, to extend through the apertures 94 and 95 and to lie against the outer face of the plate 75. In this manner the legs of the U-shaped spring 96 tend to maintain the apertures 94, 95 in congruent relation with one another so as to maintain the lever 85 in the position illustrated in FIGURE 9. Upon the release of depressional force on the member 87 tending to rotate the lever 85 to the position illustrated in FIGURE 10, the upper leg of the U-shaped spring 96 will tend to return the lever 85 to the position illustrated in FIGURE 9. It will thus be noted that when the lever 85 has been moved to an extreme counter-clockwise rotated position as is illustrated in FIGURE 11 the biasing force of spring member 96 tending to move the lever 85 to the position illustrated in FIGURE 9 is not sufficient to cause flexure of the leg 88 to move nib 91 over pin 92 so that the lever 85 remains in the position illustrated in FIGURE 11. When the lever 85 has been moved to the position illustrated in FIGURE 11 and it is desired to return the lever to the intermediate position, it is necessary to exert an upward force on the member 87 to cause flexure of the leg 88 to move the rounded projection 91 up and over the pin 92. However, when the lever 85 is in either of the positions illustrated in FIGURE 10 or in FIGURE 12, the mere release of pressure from the member 87 will effect return movement of the lever 85 to the position illustrated in FIGURE 9 through the biasing action of spring member 96.

It will herein be noted that a pair of nibs 98 and 99 project outwardly from the face of the gear 78 and that the nib 98 is spaced radially a greater distance from the rotational axis of the gear 78 than is the nib 99. In this connection it will be noted that a nib 100 is pressed outwardly from the plate 75 and extends parallel thereto and that the nib is arranged to maintain the leg 88 of lever 85 in sliding engagement with the plate 75 and that the gear 78 is so positioned with respect to the plate 75 that the leg 88 and the gear 78 are disposed in spaced relation with respect to one another to prevent engagement of the nibs 98 or 99 with the arm 88 during rotation of gear 78. It will further be understood that an inturned nib 101 is formed on the outer free end of the arm 89 and that this nib is arranged to selectively engage the nibs 98 and 99 on the gear wheel 78 to prevent rotation thereof.

Thus, although the gear 78 is constantly urged to rotate through the intermediate gear 83, such rotatable movement of gear 78 is prevented when the lever 85 is in the position illustrated in FIGURE 9 wherein the nib 101 on arm 89 is in engagement with the outwardly pressed nib 98 formed integrally with gear 78. Accordingly, depressional movement of member 87 will rotate the lever 85 in a counter-clockwise direction to the position illustrated in FIGURE 10 and nib 101 will be moved out of engagement with nib 98 thus freeing the gear 78 to effect rotation thereof. Similarly, further depressional movement of the member 87 will effect further counter-clockwise rotational movement of the lever 85 to the position illustrated in FIGURE 11, in the manner which has been hereinbefore described, so that the lever 85 does not have to be manually held in the running position. In the latter position the gear member 78 will still obviously be free to rotate until lever 85 has again been returned to the position illustrated in FIGURE 9. It will be understood that due to the location of the nibs 98 and 99 the gear 78 will always be stopped thereby in the same angular position so that by properly timing the shafts 32 and 74 the mechanism can be so arranged that the shutter always covers the exposure aperture when the mechanism is stopped.

Clockwise rotatable movement of the lever 85 about pin 86 against the biasing force of the lower leg of U-shaped spring 96 will move the nib 101 radially inwardly with respect to the rotational axis of gear 78 and out of engagement with nib 98. If the lever 85 is maintained in this position by the operator the gear 78 will move through approximately one revolution until the nib 101 engages nib 99. Upon such engagement rotary movement of gear 78 will be stopped and upon release of pressure from the member 87 the spring 96 will return the lever 85 to the position illustrated in FIGURE 9 and nib 101 will move out of engagement with nib 99 to thereby permit a slight degree of rotation of the gear 78 until nib 101 contacts nib 98.

Directing attention once again specifically to FIGURES 1 and 5–6, it is to be observed that an indicator needle 103 and an entrapment needle 104 are suitably affixed to a pin 26a (see FIGURE 8) which is corotatably movable with the meter coil 38 so that upon rotatable movement of the coil 38 the needles 103 and 104, which are disposed in substantially right angular relation with respect to one another, will move rotatably also. In order to statically balance the galvanometer 26 and the associated needles 103, 104 a pair of counter-balancing weights 105 and 106 are disposed on the short ends of needles 104 and 103, respectively.

The entrapment needle 104 has its outer free end disposed in juxtaposition to a plate 107 which forms a part of a two-plate assembly 108 which includes, in addition to the plate 107, a second plate 109 formed substantially congruently with the plate 107. It may further be seen that the entrapment needle 104 has a laterally projecting leg 110 formed on the outer end thereof which is movable along arcuate face 111 of the two-part assembly 108. It will further be understood that the plates 107 and 109 are maintained in spaced relation with respect to one another by spacing washers 112 (as viewed in FIGURE 4) and that the two-part assembly 108 is secured within the camera body by means of a pair of screws 113 which are screw-threaded into the wall 17.

An entrapment arm 115, formed integrally with iris member 27 and having a stepped sloping abutment face 116, is pivotally movable about pin 63 in the space between plate 107 and 109.

It will thus be observed that the greater the degree of counter-clockwise rotatable movement of the entrapment needle 104 from the position illustrated in FIGURE 5 the greater will be the degree of counter-clockwise rotatable movement permitted the arm 115 of iris member 27. Thus, when the entrapment needle 104 is in the position illustrated in FIGURE 5 the arm 115 of iris member 27 can move in a counter-clockwise direction only until the abutment face 116 thereof moves into contact with arm 110. It will further be apparent that when the arm 115 is in engagement with the arm 110, the arm 110 will be squeezed between arm 115 and arcuate face 111 so that further movement of the entrapment needle 104 in either direction cannot be effected. When, on the other hand, the iris member 27 is again moved in a clockwise direction about pivot pin 63 through the action of cam 31 the entrapment arm 104 may then be moved to a position such as is shown in FIGURE 6 so that upon the return of arm 115 in a counter-clockwise direction, through the action of spring member 69, the iris member 27 can move in a counter-clockwise direction about pivot pin 63 through a greater arc than was before possible.

Figure 7:
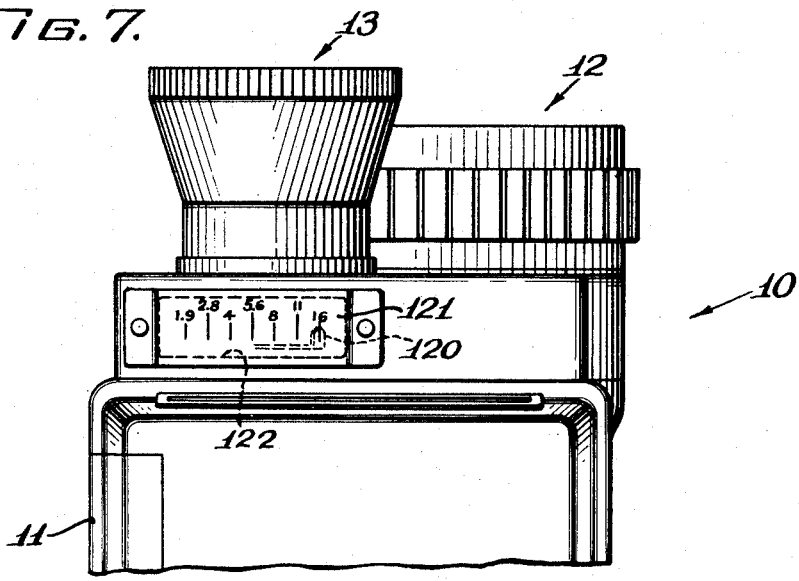
FIGURE 7 is a plan view of the forward end of the camera illustrated in FIGURES 1–6.

As best shown in FIGURES 5–7, the indicator needle 103 may have a bent over outer free end portion 120 so that the relative angular position of the meter coil 38, the entrapment needle 104, and accordingly the relative size of diaphragm opening 29, can be observed by the operator through a viewing glass 121 disposed over an aperture 122 in cover plate 53 and secured to the plate.

Accordingly, and in view of the foregoing, the operation of the camera illustrated and described herein may be somewhat as follows: Assuming first that the spring urged power source has been fully wound and that the mechanism 33 is in the position illustrated in FIGURE 11, the power shaft 32 will be rotatably driven through shaft 74 by means of gears 76 and 77 so that the rotary shutter 23 will be alternately opening and closing the exposure aperture 22 during successive film feed intervals. Since spring member 69 normally tends to maintain the iris members 27 and 28 in the diaphragm open position in the manner which has hereinbefore been fully described and since rotation of the cam 31 acts through spring member 30 to move the iris members 27 and 28 to a diaphragm closed position, rotation of the shaft 32 will effect rotatable movement of cam 31 to thereby reciprocably move the iris members 27 and 28 with respect to one another to alternately increase and decrease the area of the diaphragm opening 29.

It is important to note that the cam 31 is so constructed and so positioned on the power shaft 32 that the iris members 27 and 28 are moved to the diaphragm open position only during that interval when the rotary shutter 23 is covering the exposure aperture 22 and, conversely, that the iris members 27 and 28 are always arranged to move to the diaphragm closed position when the rotary shutter uncovers the aperture 22. Attention is now directed to the entrapment needle 104 affixed to the galvanometer coil 38 for co-rotatable movement therewith and to the fact that the needle 104 and accordingly, the meter coil 38 of galvanometer 26, is free to move rotatably only during those intervals when the iris members 27 and 28 have moved to a diaphragm open position thereby moving the angular face 116 of arm 115 out of engagement with leg 110 formed integrally with the needle 104. Thus, during that interval when the rotary shutter is covering the exposure aperture 22 and the iris members 27 and 28 are in the diaphragm open position, as is illustrated in FIGURE 5, the meter coil 38, and consequently the entrapment needle 104, will be free to move rotatably in proportion to the intensity of light impinging on the photoelectric cell 25. Thus, it will be observed that when the meter coil 38 and the entrapment needle 104 are in the position illustrated in FIGURE 5 the intensity of light impinging on the photoelectric cell 25 is probably quite low. Since, however, the interval when the iris members 27 and 28 are in the diaphragm open position, and the arm 115 is out of engagement with the leg 110, is relatively short, the entrapment needle 104 cannot move through a complete arc from the position illustrated in FIGURE 5 to the position illustrated in FIGURE 6 even if the increase in the intensity of light impinging on the photoelectric cell 25, warrants such movement. The needle 104 will, rather, move by a series of stages or steps between the two positions. Such sluggish or hysteretic movement on the part of the needle 104 is incorporated in the diaphragm opening control mechanism by design to render the meter coil 38 and the entrapment needle 104 connected therewith, relatively insensitive to movements of the camera itself. Accordingly, while the entrapment needle 104 can be moved gradually along the arcuate face 111 of two-part assembly 108 as a function of the amount of electrical energy transmitted to the galvanometer 26 from the photoelectric cell 25 the needle 104 is not likely to be jarred or moved quickly out of position by movement of the camera itself.

Since rotatable movement of the meter coil 38 is obviously a function of the effective area of the diaphragm opening 29, an indicator needle 103 is connected to the meter coil 38 for co-rotatable movement with respect thereto and is visible through a viewing glass 121 at the upper end of the casing 53 to provide a means for indicating to the operator the relative size of the diaphragm opening. While such indicator means would not be necessary for a completely automatically operating photographic camera it would be advantageous, if not necessary, to incorporate such an indicator means in a camera which was designed to operate both automatically and manually through rotation of the galvanometer coil 38.

In addition to the foregoing, it will again be noted that applicant has provided a diaphragm opening control mechanism for a photographic camera which need not be inertially balanced in order to render the same relatively insensitive to movements of the camera itself.

Furthermore, a mechanism for controlling the operation of the camera has been illustrated and described which aside from an intermediate stop position also has incorporated therewith a means for initiating movement of the various parts and for locking the control mechanism in this position and, lastly, for permitting single frame movement of the various parts of the camera.

It will herein be understood that the foregoing embodiment of the invention has been used for illustrative purposes only and that various modifications and variations in the present invention may be effected without departing from the spirit and scope of the novel concepts thereof.

I claim as my invention:

1. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, electrical-mechanical transducer means providing a mechanical element movable in response to variations in the electrical output of said cell, said diaphragm comprising at least one blade member movable across said aperture to close said aperture, means interconnecting said blade and said shutter for moving said blade to aperture open position simultaneously with the closure of said shutter, means moving said blade across said aperture to close said aperture simultaneously with the opening of said shutter, means for blocking movement of said blade in the aperture closing direction and means positioning said last named means in response to the position of said element whereby said diaphragm opening is responsive to the position of said element.

2. In combination in a moving picture camera having a film exposing aperture, a film transporting mechanism for transporting film intermittently past said aperture, a shutter for intermittently covering said aperture, drive means for simultaneously closing said shutter and transporting said film and then opening said shuter and holding said film fixed, a diaphragm for adjusting the amount of light reaching said aperture, the improvement comprising means automatically adjusting said diaphragm in response to the light available comprising a photoelectric cell, electrical-mechanical transducer means providing a mechanical element movable in response to variations in the electrical output of said cell, said diaphragm comprising at least one blade member movable across said aperture to close said aperture, means interconnecting said blade and said shutter for moving said blade to aperture open position simultaneously with the closure of said shutter, means moving said blade across said aperture to close said aperture simultaneously with the opening of said shutter, means for blocking movement of said blade in the aperture closing direction and means positioning said last named means in response to the position of said element whereby said diaphragm opening is responsive to the position of said element, said last named means comprising an extension from said element.

3. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, electrical-mechanical transducer means providing a mechanical element movable in response to variations in the electrical output of said cell, said diaphragm comprising at least one blade member movable across said aperture to close said aperture, means moving said blade to aperture open position simultaneously with the closure of said shutter, means interconnecting said blade and said shutter for moving said blade across said aperture to close said aperture simultaneously with the opening of said shutter, means for blocking movement of said blade in the aperture closing direction and means positioning said blocking means in response to the position of said element whereby said diaphragm opening is responsive to the position of said element, said electrical-mechanical transducer comprising a galvanometer the coil of which comprises said element, and said blocking means comprising an extension on said element.

4. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, a galvanometer having a rotatable meter coil associated therewith movable in response to variations in the electrical output of said photoelectric cell, said diaphragm comprising a plurality of overlapping blades movable across said aperture to close said aperture, means interconnecting said blade and said shutter for moving said blades to aperture open posiitons simultaneously with the closure of said shutter, resilient means moving said blades across said aperture to close said aperture simultaneously with the opening of said shutter, means for a blocking movement of said blades in the aperture closing direction and means positioning said last named means in response to the position of said meter coil whereby said diaphragm opening is responsive to the intensity of light impinging on said photoelectric cell.

5. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, a galvanometer having a rotary meter coil associated therewith movable in response to variations in the electrical output of said cell, said diaphragm comprising at least one blade member movable across said aperture to close said aperture, means interconnecting said blade and said shutter for moving said blade to aperture open positions simultaneously with the closure of said shutter, means moving said blade across said aperture to close said aperture simultaneously with the opening of said shutter, means for blocking movement of said blade in an aperture closing direction comprising an indicator needle affixed to said meter coil and positioned in the path of movement of said blade.

6. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, electrical mechanical transducer means providing a mechanical element movable in response to variations in the electrical output of said cell, said diaphragm comprising at least one blade member movable across said aperture to close said aperture, means interconnecting said blade and said shutter for moving said blade to aperture open positions simultaneously with the closure of said shutter, means moving said blade across said aperture to close said aperture simultaneously with the opening of said shutter, means for blocking movement of said blade in the aperture closing direction and means positioning said last named means in response to the position of said element whereby said diaphragm opening is responsive to the position of said element, and means automatically stopping said camera drive in shutter closed position and blade open position and rendering said element free to move.

7. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, electrical mechanical transducer means providing a mechanical element movable in response to variations in the electrical output of said cell, said diaphragm comprising at least one blade member movable across said aperture to close said aperture, means interconnecting said blade and said shutter for moving said blade to aperture open positions simultaneously with the closure of said shutter, means moving said blade across said aperture to close said aperture simultaneously with the opening of said shutter, abutment means for blocking movement of said blade in the aperture closing direction, means positioning said abutment means in response to the position of said element whereby said diaphragm opening is responsive to the position of said element, means for preventing controlling movement of said abutment means when said blade is in an aperture closed position, and means automatically stopping said camera drive in shutter closed position and blade open position and rendering said abutment means free to move.

8. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, a galvanometer having a rotary meter coil associated therewith movable in response to variations in the electrical output of said cell, said diaphragm comprising at least one blade member movable across said aperture to close said aperture, means interconnecting said blade and said shutter for moving said blade to aperture open positions simultaneously with the closure of said shutter, means moving said blade across said aperture to close said aperture simultaneously with the opening of said shutter, means for blocking movement of said blade in an aperture closing direction comprising an indicator needle affixed to said meter coil and positioned in the path of movement of said blade, means for fixing said needle to prevent controlling movement thereof when said blade is in an aperture open position, and means automatically stopping said camera drive in shutter closed position and blade open position and rendering said needle free to move.

9. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, a glavanometer having a rotatable meter coil associated therewith movable in response to variations in the electrical output of said photoelectric cell, said diaphragm comprising a plurality of overlapping blades movable across said aperture to close said aperture, biasing means moving said blades to aperture open positions simultaneously with the closure of said shutter, resilient means interconnecting said blade and said shutter for moving said blades across said aperture to close said aperture simultaneously with the opening of said shutter, abutment means for blocking movement of said blades in the aperture closing direction, means positioning said last named means in response to the position of said meter coil whereby said diaphragm opening is responsive to the intensity of light impinging on said photoelectric cell, and means for fixing said abutment means to prevent controlling movement thereof when said collapsible blades are in a diaphragm closed position and said rotary shutter is in an aperture open position, and means automatically stopping said camera drive in shutter closed position and blade open position and rendering said element free to move.

10. In a photographic camera having a film exposing aperture, the improvement comprising means automatically adjusting said diaphragm in response to the light available comprising a photoelectric cell, electrical-mechanical transducer means providing a mechanical element movable in response to variations in the electrical output of said cell, said diaphragm comprising at least one blade member movable across said aperture to close said aperture, means normally holding said blade in its aperture-open position, means interconnecting said blade and said shutter for moving said blade across said aperture to close said aperture when said shutter is open, means for blocking movement of said blade in the aperture closing direction and means positioning said last named means in response to the position of said element whereby said diaphragm opening is responsive to the position of said element.

11. In combination in a moving picture camera having a film exposing aperture, a film transporting mechanism for transporting film intermittently past said aperture, a shutter for intermittently covering said aperture, drive means for simultaneously closing said shutter and transporting said film and then opening said shutter and holding said film fixed, a diaphragm for adjusting the amount of light reaching said aperture, the improvement comprising means automatically adjusting said diaphragm in response to the light available comprising a photoelectric cell, electrical-mechanical transducer means providing a mechanical element movable in response to variations in the electrical output of said cell, said diaphragm comprising at least one blade member movable across said aperture to close said aperture, means normally holding said blade in its aperture-open position, means interconnecting said blade and said shutter for moving said blade across said aperture to close said aperture when said shutter is open, means for blocking movement of said blade in the aperture closing direction and means positioning said last named means in response to the position of said element whereby said diaphragm opening is responsive to the position of said element.

References Cited in the file of this patent

UNITED STATES PATENTS

| | | |
|---|---|---|
| 1,825,253 | Victor | Sept. 29, 1931 |
| 1,934,484 | Camilli | Nov. 7, 1933 |
| 2,194,158 | Adams | Mar. 19, 1940 |
| 2,206,086 | Gaylon | July 2, 1940 |
| 2,213,742 | Mihalyi | Sept. 3, 1940 |
| 2,841,064 | Bagby et al. | July 1, 1958 |